United States Patent [19]
Allen et al.

[11] Patent Number: 4,979,142
[45] Date of Patent: Dec. 18, 1990

[54] TWO-BIT FLOATING POINT DIVIDE CIRCUIT WITH SINGLE CARRY-SAVE ADDER

[75] Inventors: Richard G. Allen; Donald L. Freerksen, both of Rochester, Minn.

[73] Assignee: International Business Machines Corporation, Armonk, N.Y.

[21] Appl. No.: 339,261

[22] Filed: Apr. 17, 1989

[51] Int. Cl.$^5$ .................................................. G06F 7/52
[52] U.S. Cl. ...................................................... 364/767
[58] Field of Search ........................................... 364/767

[56] References Cited

U.S. PATENT DOCUMENTS

| 3,591,787 | 7/1971 | Freiman et al. | 364/767 |
| 3,684,879 | 8/1972 | Koehler | 364/767 |
| 3,733,477 | 5/1973 | Tate et al. | 364/767 |
| 3,852,581 | 12/1974 | Reynard et al. | 364/767 |

OTHER PUBLICATIONS

Jackson et al., "Binary Multiplication & Division Utilizing a Three-Input Adder" *IBM Tech. Disclosure Bulletin*, vol. 15, No. 7, Dec. 1972, pp. 2263-2268.

Primary Examiner—David H. Malzahn
Attorney, Agent, or Firm—Paul L. Sjoquist

[57] ABSTRACT

Apparatus and method for performing floating point divide operations in 2-bit, non-restoring iterations, wherein multiples of the divisor are formed by selective gating of one or more representations of the divisor into a single 3-input adder circuit, to calculate the partial quotients and subsequent partial dividends. The apparatus produces, without the need of separate holding registers, the zero, ½, ¾, 1 and 3/2 multiples of the divisor.

18 Claims, 3 Drawing Sheets

TWO-BIT FLOATING POINT DIVIDE CIRCUIT WITH SINGLE CARRY-SAVE ADDER

BACKGROUND OF THE INVENTION

The present invention relates to a method and apparatus for performing certain floating point arithmetic operations in a data processing system. More particularly, the invention relates to an apparatus and method for implementing the apparatus, wherein five multiples of the divisor are produced without additional registers, for use in the divide iterations to produce a quotient, and wherein the floating point division circuit has a single carry-save adder circuit.

The use of floating point arithmetic operations in a data processing system has been a common practice practically since the inception of computer technology. The development of floating point arithmetic hardware has taken many forms, usually with the objectives of simplifying the hardware construction, or enhancing the speed of the arithmetic processing operation. The four arithmetic operations of add, subtract, multiply and divide have usually been accomplished by using specialized subsets of processes involving addition and subtraction. For example, multiplication operations have in many cases been performed by repeated addition processes, and division has been accomplished by a process of repeated subtraction. The efforts made to speed up these processing operations have focused on enhancements and simplifications of hardware circuit design, particularly the adder circuit, which ultimately limits the maximum processing speed of all arithmetic operations. In the case of division, efforts have been made to increase the speed of operation by calculating partial quotients, or by simultaneously predicting multiple quotient bits, to reduce the number of addition or subtraction iterations required for the divide calculation.

An American national standard has been developed in order to provide a uniform system of rules for governing the implementation of floating point arithmetic systems. This standard is identified as ANSI/IEEE Standard No. 754-1985, and is incorporated by reference herein. In the design of floating point arithmetic systems and algorithms, it is a principal objective to achieve results which are consistent with this standard, to enable users of such systems and algorithms to achieve conformity in the calculations and solutions to problems even though the problems are solved using different computer systems. The standard specifies basic and extended floating point number formats, arithmetic operations, conversions between integer and floating point formats, conversions between different floating point formats, conversions between basic format floating point numbers and decimal strings, and the handling of certain floating point exceptions.

The typical floating point arithmetic operation may be accomplished in either single precision or double precision format. Each of these formats utilizes a sign, exponent and fraction field, where the respective fields occupy predefined portions of the floating point number. In the case of a 32-bit single precision number the sign field is a single bit occupying the most significant bit position; the exponent field is an 8-bit quantity occupying the next-most significant bit positions; the fraction field occupies the least significant 23-bit positions. In the case of a double precision floating point number the sign field is a single bit occupying the most significant bit position; the exponent field is an 11-bit field occupying the next-most significant bit positions; the fraction field is a 52-bit field occupying the least significant bit positions.

After each floating point answer is developed, it must be normalized and then rounded. When the answer is normalized, the number of leading zeros in the fraction field is counted. This number is then subtracted from the exponent and the fraction is shifted left until a "1" resides in the most significant bit position of the fraction field. Certain floating point answers cannot be normalized because the exponent is already at its lowest possible value and the most significant bit of the fraction field is not a "1".

In designing the hardware and logic for performing floating point arithmetic operations in conformance with ANSI/IEEE Standard 754-1985, it is necessary and desirable to incorporate certain additional indicator bits into the floating point hardware operations. These indicator bits are injected into the fraction field of the floating point number, and are used by the arithmetic control logic to indicate when certain conditions exist in the floating point operation. For example, an "implicit" bit I is created by the arithmetic control logic when the exponent of the floating point number has a nonzero value. The implicit bit I is created at the time a floating point number is loaded into the arithmetic registers, and the implicit bit I occupies the first bit position in the fraction field of the number. In addition, a "guard" bit G is set by the floating point control logic during certain arithmetic operations, as an indicator of the loss of precision of the floating point number being processed. The G bit is set when a right shift, required for normalization, shifts a significant bit off the right side of the register capacity. For single precision numbers the G bit occupies bit position 25 in the fraction field; for double precision numbers the G bit occupies position 54 in the fraction field. A "round" bit R is similarly used for certain floating point arithmetic operations, and is set by the arithmetic control logic, and the R bit occupies bit position 26 in the fraction field of a single precision number, and bit position 55 in the fraction field of a double precision number. Finally, a "sticky" bit S is an indicator bit which is set in certain floating point arithmetic operations when any lower precision bit is a "1", as an indicator that the floating point number has lost some precision. The S bit occupies position 27 of the fraction field in a single precision floating point number, and position 56 in the fraction field of a double precision floating point number.

The three extra bits in the fraction field are used exclusively for rounding operations, after the result has been normalized. The guard (G) and round (R) bits are treated as if they are a part of the fraction; they are shifted with the rest of the fraction, and included in all arithmetic. The sticky (S) bit is not shifted with the fraction, but is included in the arithmetic. It acts as a "catcher" for 1's shifted off the right of the fraction; when a 1 is shifted off the right side of the fraction, the S bit will remain a 1 until normalization and rounding are finished.

In a rounding operation there are typically four modes of rounding which are used, as follows:
(1) round to nearest;
(2) round to positive infinity;
(3) round to negative infinity;
(4) round to zero.

The "round to nearest" mode means that the value nearest to the infinitely precise result should be delivered. If the two nearest representable values are equally near, the one with its least significant bit zero shall be delivered. The "round to positive infinity" mode means that the value closest to and not less than the infinitely precise result should be delivered. The "round to negative infinity" mode means that the value closest to and not greater than the infinitely precise result should be delivered. The "round to zero" mode means that the result delivered should be the closest to but not greater in magnitude than the infinitely precise result. If none of the G, R, and S bits are a "1", no rounding will be accomplished regardless of the mode of rounding selected.

Unfortunately, any arithmetic circuit utilizing an adder for carrying out an addition or subtraction inevitably involves the generation of carry bits which are propagated from least significant bit positions to more significant bit positions, and can in fact be propagated throughout all bit positions during an arithmetic operation. This has the affect of extending the processing time required for completing a calculation, and various design efforts have been made to deal with this problem. For example, U.S. Pat. No. 4,754,422, issued June 28, 1988, discloses a dividing apparatus utilizing three carry-save adders in an effort to produce a plurality of quotient bits during each iteration or cycle of arithmetic operation. U.S. Pat. No. 3,621,218, issued Nov. 16, 1971, discloses a high-speed divider utilizing a single carry-save adder for producing a plurality of quotient bits during each iteration of the arithmetic operation, and a plurality of registers for holding a sequence of partial quotients used in the operation.

IBM Technical Disclosure Bulletin, Volume 14, No. 11, Apr. 1972 (pages 3279–3281) discloses a divider for producing two quotient bits per iteration, utilizing two carry-save adders and certain multiples of the divisor to speed up the operation.

The present invention is an improvement over the foregoing disclosures, for generating two quotient bits per iteration by producing five multiples of the divisor, with the improved feature of using only a single carry-save adder, and no additional registers for holding the divisor multiples. It is therefore a principal object of this invention to provide a floating point divide circuit, and method for operating the circuit, which generates two quotient bits per iteration by producing five multiples of the divisor without requiring additional registers, and utilizes only a single carry-save adder.

It is a further object of the present invention to provide a floating point division circuit capable of generating two quotient bits per iteration, by utilizing a circuit common to other floating point arithmetic operations such as add, subtract and multiply.

It is a further object of the present invention to provide an apparatus and method for floating point arithmetic operations, wholly in conformance with ANSI/IEEE Standard No. 754–1985.

It is a further object of the present invention to provide an apparatus and method for achieving certain floating point arithmetic operations in a shorter time period than previously obtained, through the selective reduction in the number of machine cycles required to provide these operations.

SUMMARY OF THE INVENTION

The invention includes registers for holding a divisor, dividend, and partial dividends, coupled to a single carry-save adder and carry-propagate adder, with a particular method for sequencing the divisor in order to produce two quotient bits for each iteration. To produce two quotient bits for each iteration, the multiples of the divisor that are required are the zero, $\frac{1}{2}$, $\frac{3}{4}$, 1, and 3/2 multiples; all of the multiples are produced by selective gating into the carry-save adder from the divisor register, using preselected latches in a multiple selector logic circuit. The zero multiple is created by inhibiting the gating from the divisor register; the one multiple is created by directly gating the divisor register; the $\frac{1}{2}$ multiple is created by gating the divisor register displaced one bit position to the right; the $\frac{3}{4}$ multiple is created by simultaneously gating the divisor shifted one position to the right ($\frac{1}{2}$) and also gating the divisor shifted two positions to the right ($\frac{1}{4}$); the 3/2 multiple is created by gating the 1 multiple and the $\frac{1}{2}$ multiple; all gating being done into one or two inputs to the carry-save adder. Since the carry-save adder can accommodate three input operands, this permits a divide iteration requiring only the divisor, and dividend or partial dividend to be stored in a register. The sequencing method includes the addition or subtraction of the multiples of the divisor to the dividend or partial dividend to produce a new partial dividend, which is shifted leftward by two positions for each iteration. The higher order bits of the divisor and dividend or partial dividend are decoded during each iteration to select the next divisor multiple; the quotient bits are decoded by examination of the partial dividend at the start of an iteration and at the end of an iteration, and examining the selected divisor multiple, to select the proper quotient bits for the iteration.

DESCRIPTION OF THE PREFERRED EMBODIMENT

Figure 1:
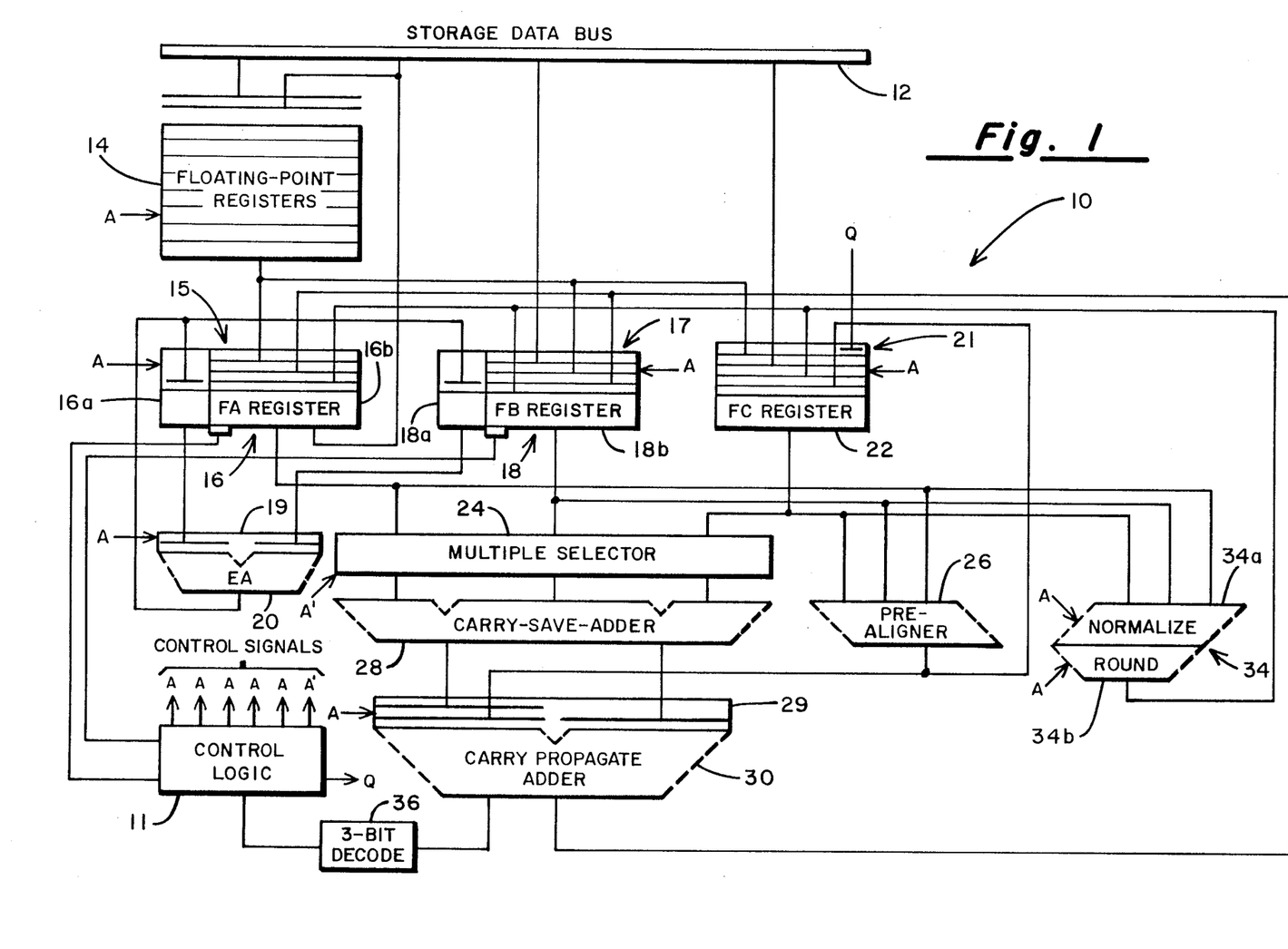
FIG. 1 shows a block diagram of a floating point arithmetic circuit used with the present invention.

Referring first to FIG. 1, there is shown a block diagram of the floating point arithmetic circuit which is used in conjunction with the present invention. The execution of floating point arithmetic utilizes this circuit because of the specific algorithms which must be performed to determine the proper results. This circuit presumes that the floating point numbers have been prearranged according to a particular format, where the most significant bit represents the sign of the floating point number, and wherein a group of the next-most significant bits represent the exponent of the floating point number, and wherein the remaining bits represent the fraction value of the number; i.e., the fraction value presuming that decimal point is placed at the left-most end of the fraction value. In the case of floating point arithmetic utilizing single precision calculations wherein the size of the number is 32 bits, the sign bit is presumed to be bit 0, the exponent bits are 1–8, and the fraction value bits are 9–31. In the case where the floating point arithmetic is accomplished utilizing double precision numbers, the sign bit is bit 0, the exponent bits are 1-11, and the fractional value bits are 12-63. In addition to the foregoing identified bits, the hardware registers and logic associated with FIG. 1 include four additional bits; the I bit occupies the most significant position in the fraction field, and the G, R and S bits respectively occupy the least significant bit positions in the fraction field.

Floating point operands cannot be added to or subtracted from each other unless their exponents are equal. This requires that their exponents be compared, and the operand fraction with the smaller exponent be shifted the amount of the exponent difference. The fractions can then be added or subtracted with the larger exponent as the result exponent. Multiplication of floating point operands requires that the exponents be added and the fractions multiplied. Division of floating point operands requires that the divisor exponent be subtracted from the dividend exponent and the dividend fraction be divided by the divisor fraction.

The floating point arithmetic circuit of FIG. 1 can support both single and double precision arithmetic operations. It is designed to support a floating point add or subtract operation, a multiply operation that retires 4 bits of multiplier per iteration, and a divide operation that generates two quotient bits per iteration.

The floating point arithmetic circuit 10 of FIG. 1 utilizes a storage data buss 12 for receiving and transmitting data from other sources, such as a data processing system or the like. Information received over data storage buss 12 may be transmitted into a plurality of floating point registers 14. In the preferred embodiment there are eight floating point registers 14, each adapted to hold the floating point operands and the results of floating point operations. Floating point registers 14 may transmit information to an FA register 16, an FB register 18, or an FC register 22. FA register 16 may also transmit information back to floating point registers 14.

The FA register 16 is a destination register for data from the floating point registers 14, and is the source register for data being transmitted to the floating point registers 14. The FA register 16 is also the source register for data which may be transferred to a memory via storage data buss 12, and it is a destination register for data transmitted from the carry-propagate adder 30, the exponent adder 20, and from the normalize-round circuit 34. The FA register 16 has outputs to the multiple selector 24, the prealigner circuit 26, the normalize-round circuit 34, and the exponent adder 20. The FA register 16 contains the second operand for add, subtract, compare, multiply and divide operations. FA register 16 has a section 16a for holding the exponent of the floating point number, and a section 16b for holding the fraction portion of the floating point number.

In order to selectively control which of the plurality of inputs to the FA register 16 are to be gated into the register, the FA register 16 has an input multiplexer circuit 15 associated therewith. Multiplexer circuit 15 provides for the selective gating of the various inputs into register 16, under control of an activation signal A. Other registers in the floating point arithmetic circuit 10 have similar multiplexer input controls.

A control logic circuit 11 generates all of the activation signals required for data interchange and processing operations within floating point arithmetic circuit 10. Control logic circuit 11 has a plurality of control signal outputs, designated A, each of which serve as control inputs to various circuits and registers. It is well within the skill of the art to understand the need and design for a control logic circuit 11, as well as the activation signals A which are required for the operation of floating point arithmetic circuit 10; accordingly, a detailed presentation of these circuits and signals is not required herein. Control logic circuit 11 also receives the most significant three bits from the FA register section 16b, and from the FB register 18b; it also receives the most significant three bits from the carry-propagate adder 30 via 3-bit decode circuit 36. Control logic 11 has decoding circuitry therein for decoding the respective 3-bit values, and for activating a particular activation signal A' which is transmitted to the multiple selector logic 24 for the purpose of selecting appropriate latches. Control logic 11 also has decoding logic for detecting whether the FB register section 18b value is true or complement, for detecting whether the carry-propagate adder 30 output is true or complement, and for detecting the particular latch signal A' which has been activated during any divide iteration. Control logic 11 utilizes these signals to generate a 2 or 3-bit quotient value Q, which it transfers to the lower two positions of the input multiplexer section 21, associated with FC register 22.

The FB register 18 is a destination register for data received from the storage data buss 12, the floating point registers 14, and is also a destination register for data from the carry-propagate adder 30. It has outputs to the multiple selector 24, the prealigner circuit 26, and the exponent adder 20. The FB register is used to contain the first operand for the add, subtract, compare and divide operations; it also contains the intermediate result of the add, subtract, multiply, and divide operations. The FB register 18 has a section 18a for containing the exponent value of the floating point number, and a section 18b for containing the fraction portion of the floating point number, and has an input multiplexer circuit 17 for gating data into the register under control of activation signals from control logic circuit 11. For divide it contains the dividend and subsequent partial dividends.

The FC register 22 is a destination register for data from memory via storage data buss 12, and a destination register for data from the normalize-round circuit 34. It is also the destination register from the floating point registers 14. The FC register 22 has outputs to the multiple selector 24, the prealigner circuit 26, and the normalize-round circuit 34. The FC register 22 is used to contain the first operand of the multiply operation, and it is the destination register for the quotient of a divide operation. An input multiplexer circuit 21 controls the gating of data into FC register 22, under control of activation signals from control logic circuit 11.

The exponent adder 20 is a 13-bit adder circuit that is used for exponent arithmetic. It handles the exponent calculations for either single or double precision exponents. The exponent adder is a source for data transmitted to FA register section 16a, and FB register section 18a. The exponent adder 20 has an input multiplexer circuit 19.

The prealigner circuit 26 is used to pre-shift the fraction with the smaller exponent for the add and subtract operation, which is necessary to make the floating point operand exponents equal prior to an add or subtract operation. The prealigner circuit 26 has the capability to shift a floating point fraction right from 0 to 55 bit positions, depending upon whether single or double precision arithmetic is being performed. The prealigner circuit 26 has an output to the carry-propagate adder 30, and to the FC register 22.

The multiple selector 24 is a logic circuit which gates multiples of the multiplicand for the multiply operation, and multiples of the divisor for the divide operation. For the divide operation, the multiples are by the control logic 11 from a decoding of the high-order bits of the dividend, or partial dividend, and of the divisor. The complement of the operand may be generated by the multiple selector when necessary. The multiple selector 24 receives data from the FA register 16, the FB register 18, and the FC register 22. The multiple selector 24 has outputs to the carry-save adder 28.

The carry-save adder 28 will permit three operands to be added together at the same time. This permits the use of a divide algorithm which generates two quotient bits per iteration. The carry-save adder 28 receives data from the multiple selector 24, and transmits data to the carry-propagate adder 30. The carry-save adder 28 may operate according to the principal of 2's complement subtraction, but in any event the results it produces for division are effectively to subtract the divisor (or a multiple of the divisor) from the dividend (or partial dividend) to form a quotient (or partial quotient) over a series of iterations, in conjunction with the carry-propagate adder 30.

The carry-propagate adder 30 is a 57-bit adder, and has an input from the carry-save adder 28 for generating the partial product of a multiply operation or the partial dividend of a divide operation. The carry-propagate adder circuit 30 may also receive inputs from the prealigner circuit 26, the FA register 16, and the FB register 18. The carry-propagate adder has an output connection to the FA register 16 and the FB register 18. An input multiplexer circuit 29 controls the gating of data into carry-propagate adder 30, under control of activation signals A from control logic circuit 11. The most significant bits output from the carry-propagate adder 30 are monitored by a 3-bit decode circuit 36, for use in connection with the divide operation to be hereinafter described.

The normalize-round circuit 34 includes a normalize circuit 34a which is used to normalize the results of a floating point operation. For example, the result of a multiply operation may require a right-shift of one bit in order to normalize the fraction, and the result of an add or subtract operation may require a left-shift of up to 54 bit positions. The normalize-round circuit 34 also includes a round circuit 34b, which contains an incrementor circuit, for use in certain rounding operations, where the result may have to be incremented by a value of 1 in the low-order bit position.

Before a divide operation can take place, both the divisor and the dividend must be normalized. The divisor is initially placed into the FA register 16, and the dividend is initially placed in the FB register 18. The divisor is normalized by gating the fractional quantity found in FA register 16b into the prealigner circuit 26, shifting the fractional quantity left by the number of leading zeros in the fraction field, and restoring the shifted value back into the FA register 16b. The number of shifts recorded is subtracted from the exponent value initially contained in FA register 16a, by a subtraction operation performed in the exponent adder circuit 20. After this subtraction is performed the subtracted value is gated back into the FA register exponent portion 16a.

The dividend is normalized by gating the fractional quantity found in FB register 18b to the normalizer 34a, shifting it left by the number of leading zeros found in the fraction, and restoring the shifted value back to the FB register 18b. The exponent value in FB register 18a is subtracted by the number of shifts recorded from the fraction shift operation, through the exponent adder circuit 20, and the subtracted value of the exponent is restored into FB register 18a.

An initialization cycle is required for the divide iterations. This is accomplished by initializing a counter to count the iterations; 13 for single precision, and 28 for double precision. The three most significant bits of the fractions in the FA register 16b and the FB registers 18b are monitored by control logic 11 to determine the divisor multiple which is to be used for the first iteration. The determination of this multiple Will be described hereinafter, with reference to FIGS. 2 and 3. The exponents in the FA register 16a and the FB register 18a are gated to the exponent adder, and the FA exponent is subtracted from the FB exponent, with the result being placed into the FA register 16a. After this initialization cycle is completed the circuit of FIG. 1 may then be utilized to perform a sequence of 13 divide iterations for single precision numbers, or 28 divide iterations for double precision numbers. The fractional dividend, or partial dividend, found in register section 18b, is divided by the fractional divisor, found in register section 16b, through a series of subtractive iterations. The divide sequence requires a non-restoring uniform shift of two bits during each iteration. It requires the 0, ½, ¾, 1, and 3/2 multiples of the divisor to be selectable by the multiple selector 24, to produce a partial dividend that can be shifted left by two bits for each iteration, and which will produce two quotient bits for each iteration. The quotient ultimately will appear in the FC register 22, and the partial dividends will be developed in register section 18b during the operation.

Figure 2:
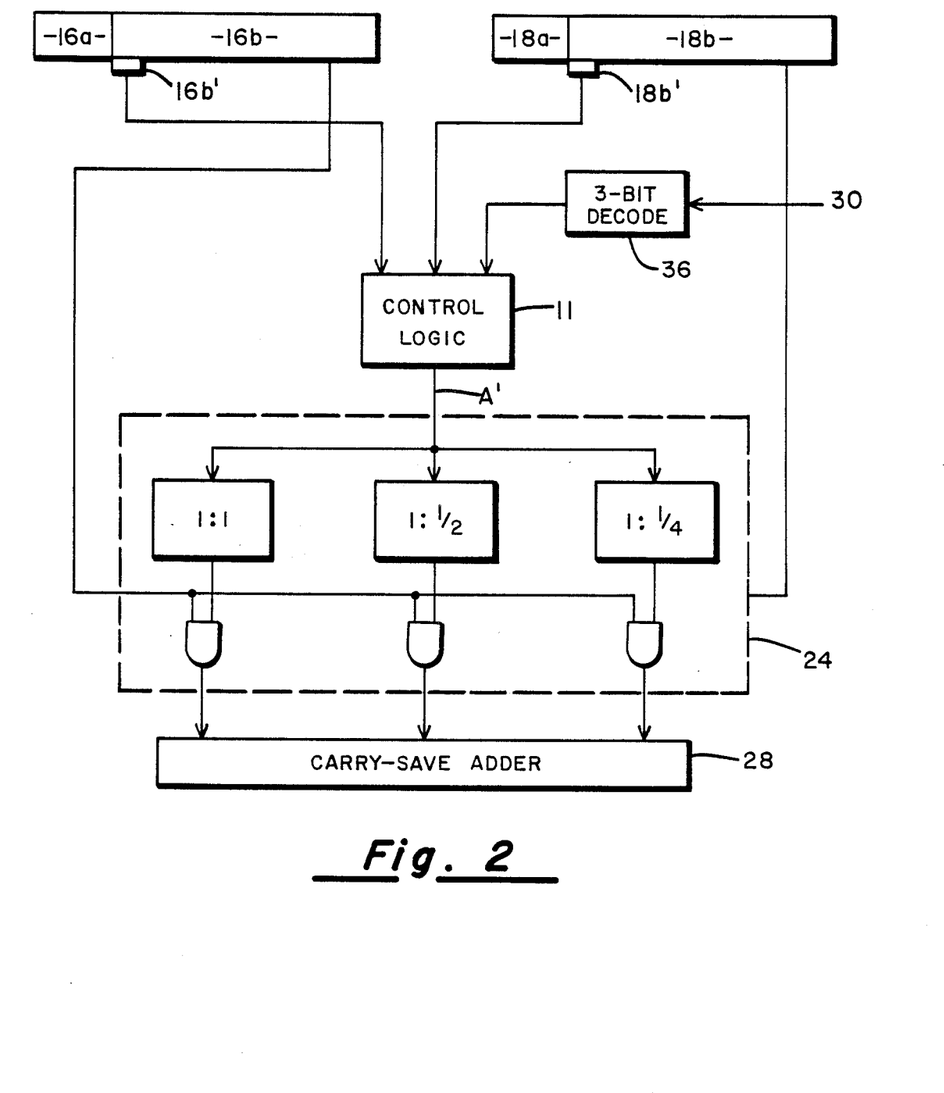
FIG. 2 shows a block diagram of the divisor multiple selection circuits.

FIG. 2 shows a portion of the floating point arithmetic circuit 10 of FIG. 1, which is associated with the selection of the divisor multiple to be used during each iteration of the divide operation. In the first cycle of the divide operation, control logic 11 monitors the most significant three bits of register 16b, designated 16b' in FIG. 2, and also monitors the most significant three bits of register 18b, designated 18b' in FIG. 2. Control logic 11 utilizes these quantities in its internal decision logic to determine the initial divisor multiple to be used in the divide operation. This determination results in the generation of a particular activation signal A', which is coupled to one or more latches in multiple selector 24. The respective latches permit selective gating of the fractional divisor held in register 16b into carry-save adder 28. For example, one A' signal will activate the latch designated 1:1, which permits the fractional contents of register 16b to be directly transferred to an input of carry-save adder 28; another activation signal A' activates the latch designated 1:½, which permits the fractional contents of register 16b to be gated to an input of carry-save adder 28, which with each bit shifted one position rightward from its respective position in register 16b; a third activation signal A' activates a latch 1:¼, which permits the gating of the fractional contents of register 16b into an input of carry-save adder 28, shifted two bit positions to the right from the respective position of the fraction in register 16b. In this manner, control logic 11 can generate an activation signal A' which gates either the divisor, or ½ divisor, or ¼ divisor into carry-save adder 28 inputs. Since carry-save adder 28 has three inputs, and is capable of adding the values represented at these three inputs, it is possible to combine activation of two latches to provide a combinatorial multiple, for example, if the latch designated 1:½ and the latch designated 1:¼ are both activated, ½ divisor will appear at one carry-save adder 28 input and ¼ divisor will appear at a second carry-save adder input, the sum of which will equal ¾ divisor. Likewise, if the latch designated 1:1 is simultaneously activated with the latch designated 1:½, the divisor and ½ divisor are simultaneously gated to inputs of the carry-save adder 28, the sum of which will produce 3/2's divisor. The zero divisor can be produced by merely inhibiting all gating from register 16b into carry-save adder 28, thereby producing a zero input to carry-save adder 28. Therefore, it is readily possible for control logic 11 to produce the zero, ½, ¾, 1, and 3/2 multiples of the divisor during any iteration of the divide cycle.

After the initial activation of the divide cycle, control logic 11 selects the divisor multiple for subsequent iterations through examination of the most significant three bits output from the carry-propagate adder 30, via a 3-bit decode circuit 36.

Control logic 11 is also coupled to register 18b and carry-propagate adder 30 to sense the most significant fractional carry bit to determine whether the current value is a true or complement number, particularly comparing the value of the partial dividend both before and after each iteration. This comparison, together with an examination of the divisor multiple used during the iteration, enables the circuit to predict whether the subtraction operation which occurs during the iteration has changed the sign of the partial dividend. If the sign has changed, the divisor multiple selected is too large, and the resulting quotient bits should be reduced or increased by a predetermined value, dependent upon the multiple used for the iteration. Control logic 11 contains an internal decision circuit which enables this comparison to be made, and which results in the selection of the appropriate quotient, dependent upon these variables. The quotient may be a 2-bit quotient Q, or in certain instances a 3-bit quotient Q. In the one case where a divisor multiple of ¾ is used during the iteration, a 3-bit quotient is produced; in all other instances a 2-bit quotient value is produced. In the case of a 3-bit quotient value, and in the case of a 2-bit quotient value, the value itself is transferred to input multiplexer section 21 at the lowest two (or three) bit positions. If a 3-bit quotient value is selected, the most significant quotient bit produced as a result of the next iteration is ignored, and the next iteration results in the transfer of a 1-bit quotient value to the input multiplexer 21.

TABLE 1 shows a table for selecting the divisor multiple as a function of the dividend, or partial dividend. The high-order three bits of the divisor and the high-order three bits of the dividend (partial dividend after the first iteration) are decoded according to the tabulation of TABLE 1 to select the multiple of the divisor for the next iteration. For example, if the high-order three bits of the true dividend are 011, and the high-order two bits of the divisor are 110, the multiple of the divisor for the next iteration which is selected will be the ½ times multiple of the divisor. The decoding conventions shown in TABLE 1 insures that the partial dividend can be shifted two bit positions and therefore, at least two quotient bit positions bits can be generated.

TABLE 1

| TRUE DIVIDEND | DIVISOR 100 | 101 | 110 | 111 | COMPLEMENT DIVIDEND | DIVISOR 100 | 101 | 110 | 111 |
|---|---|---|---|---|---|---|---|---|---|
| 000 | 0 | 0 | 0 | 0 | 000 | 3/2 | 3/2 | 1 | 1 |
| 001 | 0 | 0 | 0 | 0 | 001 | 3/2 | 1 | 1 | 1 |
| 010 | 1/2 | 1/2 | 1/2 | 1/2 | 010 | 1 | 1 | 1 | 3/4 |
| 011 | 1/2 | 1/2 | 1/2 | 1/2 | 011 | 1 | 1 | 3/4 | 3/4 |
| 100 | 1 | 1 | 3/4 | 3/4 | 100 | 1/2 | 1/2 | 1/2 | 1/2 |
| 101 | 1 | 1 | 3/4 | 3/4 | 101 | 1/2 | 1/2 | 1/2 | 1/2 |
| 110 | 3/2 | 1 | 1 | 1 | 110 | 0 | 0 | 0 | 0 |
| 111 | 3/2 | 3/2 | 1 | 1 | 111 | 0 | 0 | 0 | 0 |

TABLE 2 shows a table for selecting at least a pair of quotient bits as a function of the partial dividend value and the divisor multiplier selected, according to non-restoring division techniques. The quotient bits which are selected depend upon three conditions:
(1) whether the partial dividend at the start of the iteration is true or complement;
(2) whether the partial dividend at the end of the iteration is true or complement:
(3) which multiple was used during the iteration. For example, if the partial dividend at the start of the iteration was true, and the partial dividend at the end of the iteration was true, and the ½ times multiple was used during the iteration, the quotient bits selected will be 01. In the case when the ¾ times multiple is used during the iteration, three quotient bits are generated. These three quotient bits are all valid, and the third bit must be used in place of the high-order bit that is generated on the next iteration.

TABLE 2

| STARTING PARTIAL DIVIDEND | ENDING PARTIAL DIVIDEND | DIVISOR MULTIPLIER USED 3/2 | 1 | 3/4 | 1/2 | 0 |
|---|---|---|---|---|---|---|
| T | T | 11 | 10 | 011 | 01 | 00 |
|   | C | 10 | 01 | 010 | 00 | — |
| C | T | 01 | 10 | 101 | 11 | — |
|   | C | 00 | 01 | 100 | 10 | 11 |

Figure 3:
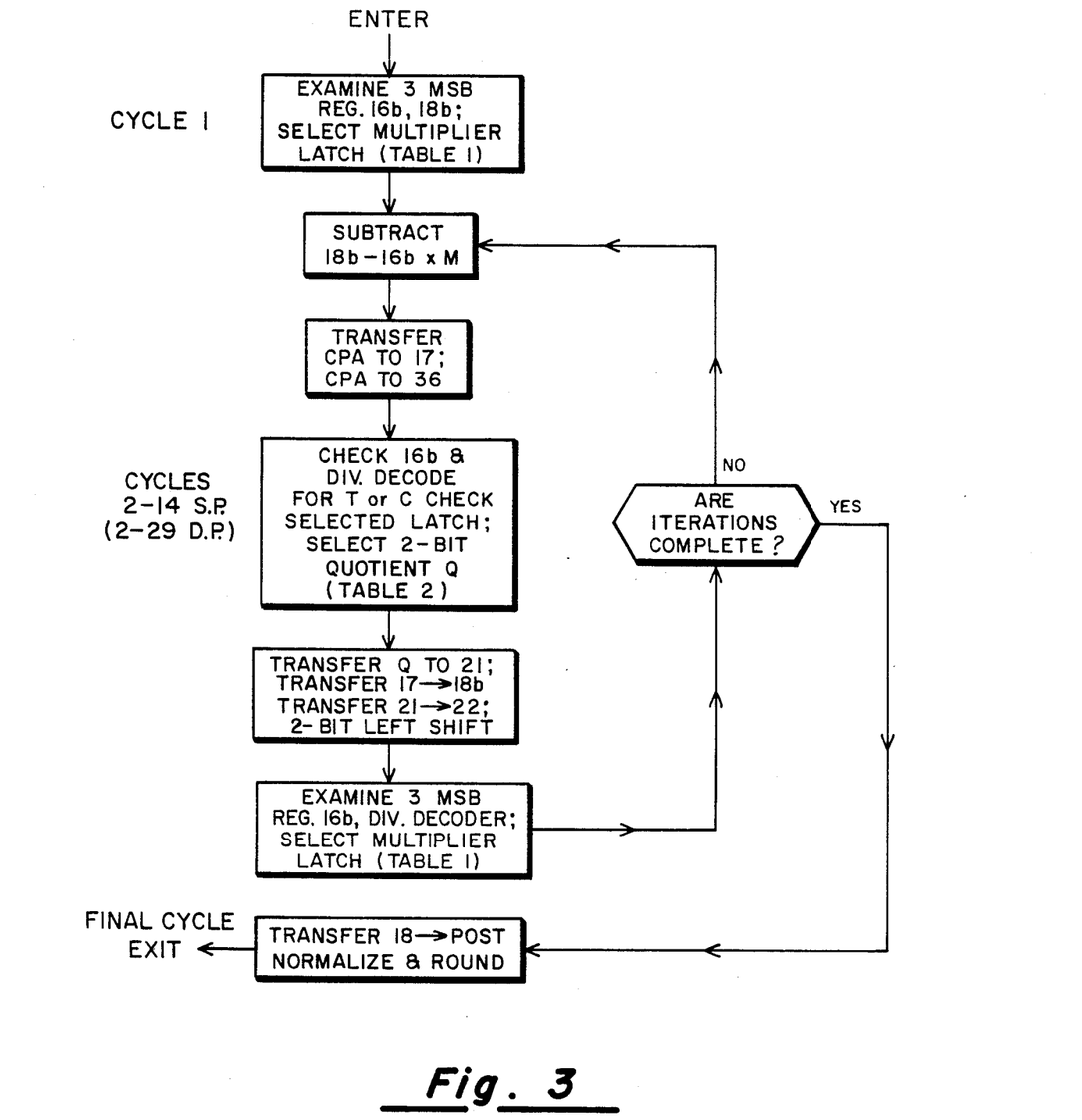
FIG. 3 shows a flow chart of the method for sequencing the apparatus of FIG. 1 and FIG. 2.

FIG. 3 shows a flow chart of the divide iterations according to the teachings of the present invention. The left side of FIG. 3 illustrates the machine cycles which are required for divide iterations, wherein cycle 1 is defined as an initial cycle for setting up the first iteration, and cycles 2–14 are the iteration cycles for single precision numbers (cycles 2–29 for double precision numbers), and the final cycle is devoted to postnormalized and round operations. The postnormalize and round operations may be accomplished according to the teachings of copending U.S. Pat. applications Ser. No. 339,348, now U.S. Pat. No. 4,926,370, issued May 15, 1990, and Ser. No. 339,268, filed of even date herewith, or may be accomplished according to usual techniques which are well known in the art.

In cycle 1 of the divide operation, the three most significant bits of the fractional quantity contained in register 16b and register 18b are examined and decoded by control logic 11. Control logic 11 then generates an activation signal A' for selecting a particular multiple latch as has been hereinbefore described, and which results in the selection of the multiple illustrated in Table 1.

After the foregoing selection has been accomplished the binary value contained in register 16b is gated into carry-save adder 28 via the latching network hereinbefore described, and is subtracted from the binary value contained in register 18b. As has been hereinbefore indicated, the subtracted value may be any of the five multiples of the divisor which have been described.

The results of this subtraction are transferred from the carry-propagate adder 30 to input multiplexer section 17; the most significant three bits of the result from carry-propagate adder 30 is received by the 3-bit decode circuit 36.

Control logic 11 then senses the three most significant bits in register 16b, and the 3-bit value found in decode circuit 36, and determines whether the respective values are true or complement values; control logic 11 also checks the multiple latch which was selected for the last subtraction. Control logic 11 then generates a 2-bit quotient Q (3-bits if multiplier was ¾), wherein Q is generated from an internal decision circuit which is illustrated in Table 2.

Control logic 11 then transfers the Q value to input multiplexer section 21, at the least significant bit positions, and then transfers the input multiplexer section 21 contents into register 22, two bit positions to the left of the least significant bit. Control logic 11 also transfers the input multiplexer 17 into register 18b to form the new partial dividend.

Control logic 11 then examines the three most significant bits in register 16b, and also examines the contents of 3-bit decode circuit 36, to make a determination through internal decision logic as to the selection of the next multiple. This multiple is selected according to the internal decision logic which is illustrated in Table 1. A new subtraction is made, and this process continues until all of the iterations for the particular divide operation have been completed.

At the completion of the divide iterations control logic circuit 11 then transfers the contents of register 18 into the normalize and round circuits 34a and 34b for postnormalize and round operations, according to the teachings of the art. Postnormalize and round occurs during a final cycle of the divide operation, and at the completion of the divide operation the quotient is found in register 22, the remainder is found in register 18, and the original divisor is still found in register 16.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An apparatus for performing a 2-bit, non-restoring floating point divide operation in a series of iterations, comprising
   (a) a divisor register for holding the divisor of said divide operation;
   (b) a dividend register for holding the dividend of said divide operation and subsequent partial dividends during respective iterations;
   (c) a quotient register for holding partial quotients during respective iterations and the quotient result;
   (d) an adder circuit having three inputs for receiving operands, one of said inputs being coupled to said dividend register;
   (e) a multiple selector circuit having respective outputs connected to the remaining two inputs of said adder circuit, and having inputs connected to said divisor register, and having means for selectively gating multiples of said divisor into said adder circuit, controllable by activation signals; and
   (f) a control logic circuit having means for sensing the three most significant divisor register bits and the three most significant dividend register bits, and having means for generating said activation signals in response thereto, to selectively gate certain multiples of said divisor into said adder circuit; said control logic circuit further comprising means for selecting predetermined divisor multiples for each iteration of said divide operation as a function of the true/complement value and the most significant three bits of the respective divisor and partial dividends according to the following tabulation:

| TRUE | DIVISOR | | | |
|---|---|---|---|---|
| DIVIDEND | 100 | 101 | 110 | 111 |
| 000 | 0 | 0 | 0 | 0 |
| 001 | 0 | 0 | 0 | 0 |
| 010 | ½ | ½ | ½ | ½ |
| 011 | ½ | ½ | ½ | ½ |
| 100 | 1 | 1 | ¾ | ¾ |
| 101 | 1 | 1 | ¾ | ¾ |
| 110 | 3/2 | 1 | 1 | 1 |
| 111 | 3/2 | 3/2 | 1 | 1 |

| COMPLEMENT | DIVISOR | | | |
|---|---|---|---|---|
| DIVIDEND | 100 | 101 | 110 | 111 |
| 000 | 3/2 | 3/2 | 1 | 1 |
| 001 | 3/2 | 1 | 1 | 1 |
| 010 | 1 | 1 | 1 | ¾ |
| 011 | 1 | 1 | ¾ | ¾ |
| 100 | ½ | ½ | ½ | ½ |
| 101 | ½ | ½ | ½ | ½ |
| 110 | 0 | 0 | 0 | 0 |
| 111 | 0 | 0 | 0 | 0; | and control logic circuit also having means for formulating partial quotients as a function of the dividend register contents before and after each of said iterations and the divisor multiples selected for said iteration.

2. The apparatus of claim 1, wherein said control logic further comprises means for selecting predetermined partial quotient values for each iteration of said divide operation as a function of the true-complement value of the partial dividend at the start of said iteration, the true/complement value of the partial dividend at the end of said iteration, and the particular divisor multiple selected for said iteration, according to the following tabulation:

| STARTING PARTIAL DIVIDEND | ENDING PARTIAL DIVIDEND | DIVISOR MULTIPLIER USED | | | | |
|---|---|---|---|---|---|---|
| | | 3/2 | 1 | ¾ | ½ | 0 |
| | T | 11 | 10 | 011 | 01 | 00 |
| T | C | 10 | 01 | 010 | 00 | — |
| | T | 01 | 10 | 101 | 11 | — |

-continued

| STARTING PARTIAL DIVIDEND | ENDING PARTIAL DIVIDEND | DIVISOR MULTIPLIER USED | | | | |
|---|---|---|---|---|---|---|
| | | 3/2 | 1 | 3/4 | 1/2 | 0 |
| C | C | 00 | 01 | 100 | 10 | 11. |

3. The apparatus of claim 1, wherein said multiple selector circuit further comprises a plurality of latches connected to said adder circuit two inputs and to outputs of said divisor register, said latches being controllable by said activation signals to gate said divisor register outputs to said adder circuit inputs in predetermined bit position transfers.

4. The apparatus of claim 3, wherein said latches further comprise means for making said predetermined bit position transfers to formulate the zero, $\frac{1}{2}$, $\frac{3}{4}$, 1 and 3/2 multiples of said divisor.

5. The apparatus of claim 4, wherein said means for making said predetermined bit position transfers for formulating the 3/2 multiple of said divisor further comprises means for simultaneously gating said divisor to one input of said adder circuit, and gating said divisor shifted by one bit position rightward to a second input of said adder, circuit.

6. The apparatus of claim 5, wherein said means for making said predetermined bit position transfers for formulating the $\frac{3}{4}$ multiple of said divisor further comprises means for simultaneously gating said divisor shifted by one bit position rightward to one input of said adder circuit, and gating said divisor shifted by two bit positions rightward to a second input of said adder circuit.

7. The apparatus of claim 6, wherein said means for making said predetermined bit position transfers for formulating the one multiple of said divisor further comprises means for gating said divisor directly into one input of said adder circuit, and inhibiting the gating into a second input of said adder circuit.

8. The apparatus of claim 7, wherein said means for making said predetermined bit position transfers for formulating the $\frac{1}{2}$ multiple of said divisor further comprises means for gating said divisor shifted one bit position rightward to one input of said adder circuit, and inhibiting the gating into a second input of said adder circuit.

9. The apparatus of claim 8, wherein said means for making said predetermined bit position transfers for formulating the zero multiple of said divisor further comprises means for inhibiting the gating into two inputs of said adder circuit.

10. The apparatus of claim 5, further comprising a 3-bit decoder circuit connected to the output of said adder circuit, said 3-bit decoder having means for sensing the three most significant bits output from said adder circuit.

11. The apparatus of claim 10, wherein each of said dividend register, said divisor register and said 3-bit decoder circuit has means for storing the sign value of the number contained therein or at the output of said adder circuit respectively, and said control logic circuit further comprises means for sensing said sign values and determining thereby whether the respective numbers are true or complement values.

12. An apparatus for performing a 2-bit, non-restoring floating point divide operation in a series of iterations, comprising (a) a divisor register for holding the divisor of said divide operation;
(b) a dividend register for holding the dividend of said divide operation and subsequent partial dividends during respective iterations;
(c) a quotient register for holding partial quotients during respective iterations and the quotient result;
(d) an adder circuit having three inputs for receiving operands, one of said inputs being coupled to said dividend register;
(e) a control logic circuit having means for sensing the three most significant divisor register bits and the three most significant dividend register bits, and having means for sensing the true/complement value of the contents of said dividend register; said control logic circuit further having means for generating activation signals in response to said respective means for sensing;
(f) a multiple selector circuit having respective outputs connected to the remaining two inputs of said adder circuit, and having inputs connected to said divisor register, and having logic circuit means for selectively gating multiples of said divisor into said adder circuit, controllable by said activation signals; said logic circuit means including means for selecting a divisor multiplier according to the following tabulation if the dividend or partial dividend is a true value:

| TRUE DIVIDEND | DIVISOR | | | |
|---|---|---|---|---|
| | 100 | 101 | 110 | 111 |
| 000 | 0 | 0 | 0 | 0 |
| 001 | 0 | 0 | 0 | 0 |
| 010 | $\frac{1}{2}$ | $\frac{1}{2}$ | $\frac{1}{2}$ | $\frac{1}{2}$ |
| 011 | $\frac{1}{2}$ | $\frac{1}{2}$ | $\frac{1}{2}$ | $\frac{1}{2}$ |
| 100 | 1 | 1 | $\frac{3}{4}$ | $\frac{3}{4}$ |
| 101 | 1 | 1 | $\frac{3}{4}$ | $\frac{3}{4}$ |
| 110 | 3/2 | 1 | 1 | 1 |
| 111 | 3/2 | 3/2 | 1 | 1 | said logic circuit means further including means for selecting a divisor multipler according to the following tabulation if the dividend or partial dividend is a complement value:

| COMPLEMENT DIVIDEND | DIVISOR | | | |
|---|---|---|---|---|
| | 100 | 101 | 110 | 111 |
| 000 | 3/2 | 3/2 | 1 | 1 |
| 001 | 3/2 | 1 | 1 | 1 |
| 010 | 1 | 1 | 1 | $\frac{3}{4}$ |
| 011 | 1 | 1 | $\frac{3}{4}$ | $\frac{3}{4}$ |
| 100 | $\frac{1}{2}$ | $\frac{1}{2}$ | $\frac{1}{2}$ | $\frac{1}{2}$ |
| 101 | $\frac{1}{2}$ | $\frac{1}{2}$ | $\frac{1}{2}$ | $\frac{1}{2}$ |
| 110 | 0 | 0 | 0 | 0 |
| 111 | 0 | 0 | 0 | 0; and |

(g) means for selecting partial quotients as a function of the contents of said dividend register before and after each of said iterations, including means for sensing the true/complement value of the partial dividend at the start of the iteration, means for sensing the true/complement value of the partial dividend at the end of the iteration, means for sensing the value of the multiplier of the divisor used during the iteration; and logic decision circuit means for selecting the partial quotient according to the following tabulation:

| STARTING PARTIAL DIVIDEND | ENDING PARTIAL DIVIDEND | DIVISOR MULTIPLIER USED | | | | |
|---|---|---|---|---|---|---|
| | | 3/2 | 1 | ¾ | ½ | 0 |
| | T | 11 | 10 | 011 | 01 | 00 |
| T | C | 10 | 01 | 010 | 00 | — |
| | T | 01 | 10 | 101 | 11 | — |
| C | C | 00 | 01 | 100 | 10 | 11. |

13. The apparatus of claim 12, wherein said multiple selector circuit further comprises a plurality of latches connected to said adder circuit two inputs and to outputs of said divisor register, said latches being controllable by said activation signals to gate said divisor register outputs to said adder circuit inputs in predetermined bit position transfers.

14. The apparatus of claim 13, wherein said latches further comprise means for making said predetermined bit position transfers to formulate the zero, ½, ¾, 1 and 3/2 multiples of said divisor.

15. The apparatus of claim 14, wherein said means for making said predetermined bit position transfers for formulating the 3/2 multiple of said divisor further comprises means for simultaneously gating said divisor to one input of said adder circuit, and gating said divisor shifted by one bit position rightward to a second input of said adder circuit.

16. The apparatus of claim 15, wherein said means for making said predetermined bit position transfers for formulating the ¾ multiple of said divisor further comprises means for simultaneously gating said divisor shifted by one bit position rightward to one input of said adder circuit, and gating said divisor shifted by two bit positions rightward to a second input of said adder circuit.

17. The apparatus of claim 16, wherein said means for making said predetermined bit position transfers for formulating the one multiple of said divisor further comprises means for gating said divisor directly into one input of said adder circuit, and inhibiting the gating into a second input of said adder circuit.

18. The apparatus of claim 17, wherein said means for making said predetermined bit position transfers for formulating the ½ multiple of said divisor further comprises means for gating said divisor shifted one bit position rightward to one input of said adder circuit, and inhibiting the gating into a second input of said adder circuit.

* * * * *